March 18, 1947.  H. C. EDDY  2,417,637
PROCESS FOR REMOVING IMPURITIES FROM OILS
Filed Dec. 1, 1939
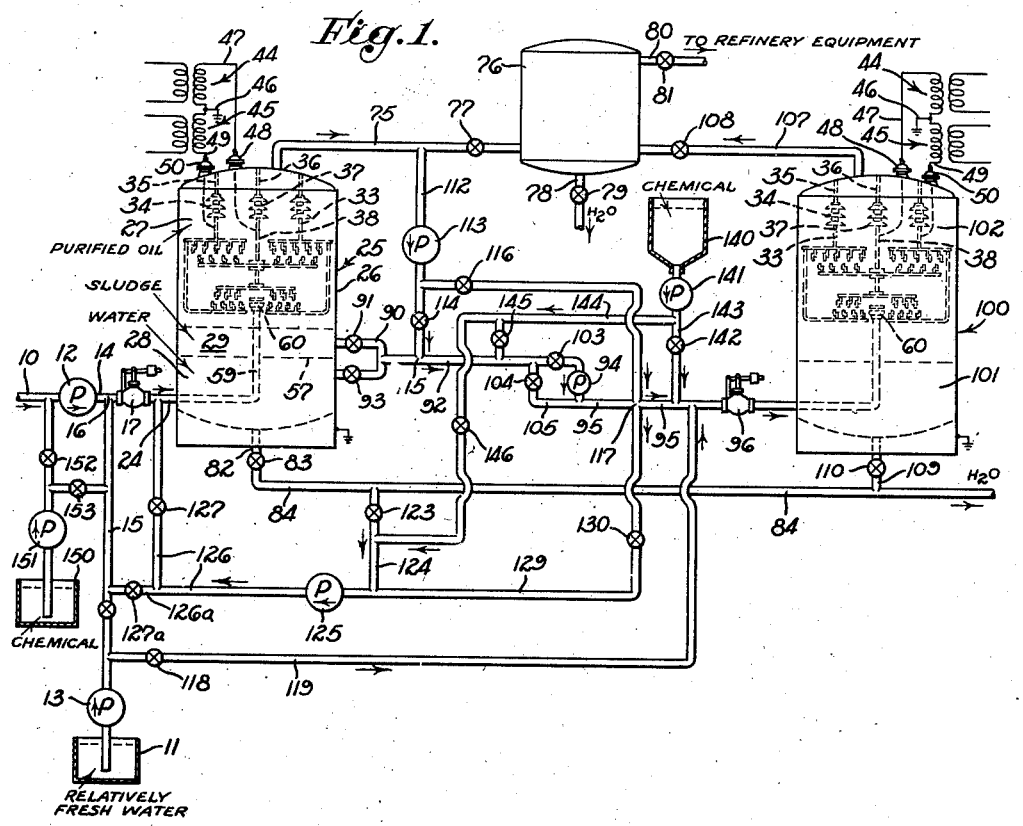
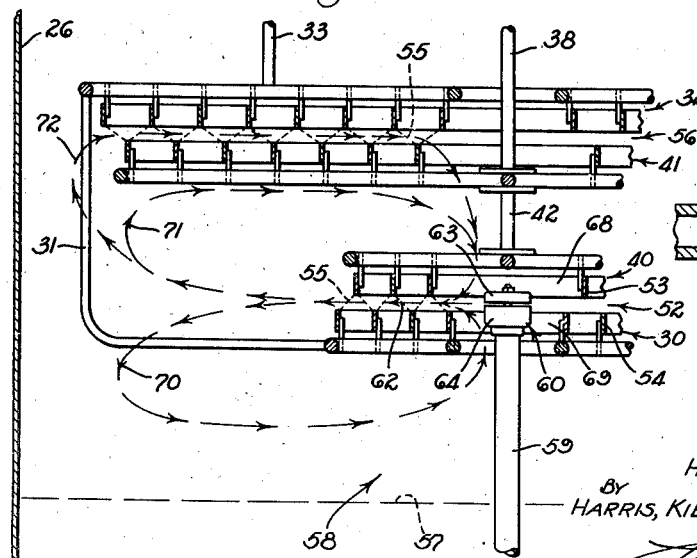
INVENTOR
HAROLD C. EDDY
BY HARRIS, KIECH, FOSTER & HARRIS
ATTORNEYS.

Patented Mar. 18, 1947

2,417,637

UNITED STATES PATENT OFFICE 2,417,637

PROCESS FOR REMOVING IMPURITIES FROM OILS

Harold C. Eddy, Los Angeles, Calif., assignor to Petrolite Corporation, Ltd., Wilmington, Del., a corporation of Delaware Application December 1, 1939, Serial No. 307,188

13 Claims. (Cl. 204—190)

My invention relates to the purification of oils and, more particularly, to a novel process and apparatus for treating oils to remove therefrom impurities capable of being taken up by relatively fresh water.

In my copending application, Serial No. 122,470 (now Patent No. 2,182,145), there is disclosed a purification process in which an oil is purified by suspending or dispersing therein small particles of a relatively fresh water and subjecting the mixture to the action of an electric field to transfer the impurities into the water phase. The suspending or dispersing of the relatively fresh water is effected by mixing, and this mixing action is controlled in such manner that the treated constituents can be separated into a purified oil of low water content and a body of water now containing the impurities, without the accumulation of such amount of sludge as would interfere with maintenance of the electric field. A preferred method of mixing is by use of a valve or other orifice-type mixing means. In the operation of the process on a typical oil, if the intensity of mixing is very low, it will be found that resolution with the aid of an electric field is not difficult, but that the percentage reduction in impurities, while surprisingly high, will be somewhat below that required to meet the most exacting conditions. For example, in this instance about 80% of the impurities may be removed.

To better the over-all efficiency in the removal of impurities, a more intense mixing action may be employed which, if properly controlled, will still permit resolution with the aid of an electric field into oil and water, without the accumulation of objectionable amounts of sludge. For example, from 85 to 90% of the impurities may be removed while maintaining the process in continuous operation. A further increase in mixing action may result in the production of an emulsion which, when passed once through an electric field, may be incompletely broken to such an extent that some sludge will tend to accumulate in the treater. Even then, by use of appropriate supplemental sludge-resolving actions, such as recycling through the field, selection of an appropriate relatively fresh water, etc., the system can be maintained in continuous operation without the accumulation of such amount of sludge as would interfere with the maintenance of the electric field, and, in this instance, the percentage removal of impurities will be even higher. Attempts to increase the mixing action further in an endeavor to raise the over-all efficiency even more will result in the building up of sludge in the treater.

The economic limit of mixing intensity has thus been limited, albeit that percentage removal of impurities might be somewhat increased if the accumulation of sludge could be prevented. In addition, certain oils are distinctly of a sludging character. For example, if the same mixing intensity is used on two oils from different sources, one may sludge badly while the other may give excellent results. The reason for this is not definitely understood. Furthermore, the intensity of mixing will be dependent, at least in part, upon the amount and character of emulsifying agent present in the incoming oil and, correspondingly, no definite figures can be set forth applicable to all oils. In general, however, the treating characteristics with increased mixing will following the conditions noted above.

Nor is the production of sludge characteristic only of the electric process. Sludge difficulties to a much greater degree are noted if other resolving expedients are used, for example, attempts to resolve the emulsion by use of settling, heat, pressure, certain chemicals, centrifuging, etc. Some of these actions will resolve only into oil and sludge with no substantial separation of free water, while others, properly controlled, may separate the constituents into a purified oil, a body of water relatively free of oil, and an intermediate layer of sludge. In all such non-electrical processes, purification is substantially less and, in general, sludge formation increases very markedly with increase in mixing intensity which, again, is desirable in an attempt to reduce the impurity content of the separated oil.

It is an object of the present invention to purify an oil by dispersing water therein and then partially resolving the resulting emulsion into a purified oil and sludge, or into a purified oil, sludge, and water, the sludge being processed electrically to resolve it into its oil and water constituents. The process is particularly applicable to the treatment of sludge which tends to accumulate in an electric treater used to purify or desalt oils of low water content, such as pipeline oils, but can be used successfully on sludges resulting from non-electrical treatment in an attempt to purify or desalt such oils of low water content, it being understood that such purifying or desalting treatments, whether or not using an electric field, involve the addition of a relatively fresh water. It is a general object of the invention to use an electric field in the processing and resolution of such sludges.

The sludge with which this invention is particularly concerned comprises essentially an unresolved emulsion. Usually, this emulsion is of the water-in-oil type, though some inverse phase emulsion may be present. Ordinarily, such sludge represents a concentrated or compacted emulsion such as will form when an artificial emulsion of the incoming oil and relatively fresh water is settled following or during application of an action which is capable of only partially resolving the artificial emulsion. For example, if dispersed saline material is to be removed from the incoming oil, relatively fresh water may be mixed therewith, using such intensity of mixing as is beyond the capability of complete resolution of the treating equipment so that separation will result in an accumulating amount of sludge. The sludge in this instance may be highly concentrated in the saline impurities, but on other oils may contain no more of the saline impurities than would be expected from its water content.

The impurities with which the process is concerned are those which are naturally present in the oil to be purified or which are present therein due to prior processing steps. In general, these impurities are such as to be capable of being taken up by a relatively fresh water, and commonly comprise water-soluble or water-wettable impurities. Exemplary of the water-soluble impurities are various water-soluble salts, for instance calcium chloride, magnesium chloride and sodium chloride, which are commonly found to be present in water-dissolved state if the oil contains a small amount of water. In other instances, some or all of the salts may be present in crystalline state. Best results are obtained in an electric purification process if such impurities are present in the field coexisting with droplets of the relatively fresh water so that the electric field can bring the two types of dispersed materials together. Exemplary of the water-wettable impurities are various water-wettable salts or minerals, for instance sand, mud, silt, and the like, which, while they may be oil-wetted in the incoming oil, are preferentially water-wettable and can be made to associate with a relatively fresh water. Various water-associatable impurities dissolved in the incoming oil can also be removed by the process, for example hydrochloric acid present due to the acid treating of producing wells.

The relatively fresh water used in the process is of such character as to be capable of taking up and becoming associated or combined with the impurities in the process. The water need not be distilled and commonly carries small amounts of minerals or chemicals. The term "relatively fresh water" as used herein has reference, if the oil contains dispersed impurity-containing water, to a water which, if it contains any of the impurities to be removed, has a materially less concentration thereof than does the originally-present dispersed water, or, if the oil carries no dispersed impurity-containing water, the term has reference to a water which has no more than a small concentration of the impurities to be removed. It is essential to this process that the added water should not contain the same impurities in the same concentration as are present in the water droplets dispersed in the incoming oil.

Generally speaking, the process is not one of dehydration for it commonly receives an oil of low water content and produces a purified oil of low water content. The process is not well adapted to efficient purification of high-water-content oils, and if such oils are encountered, it is very desirable to reduce the water content to not more than a few per cent before applying the purifying steps hereinafter described. For example, a well-produced crude oil emulsion is preferably dehydrated to reduce its water content to not more than a few per cent before applying the purifying steps herein-contemplated. The process works best on an oil containing not more than about 3% of water, and is not well adapted to oils containing more than about 8% or 10% of water. One of its best applications is in the removal of dispersed saline impurities from an oil containing no more than a few per cent of water, and it is often used on oils which are dry or which contain less than 1% of dispersed water. Even such oils contain in many instances as high as 500–1000 lbs. of saline impurities per 1000 barrels of oil, and the process is generally capable, with careful control, of reducing the saline content of the purified oil to less than 10 lbs./1000 barrels.

The process will be exemplified with reference to the processing of a petroleum oil, though it should be clear that the invention is not limited thereto for it is applicable to any oil of sufficiently high resistivity to be treatable in an electric field. For purpose of clarity, the invention will be described in detail with reference to the removal of saline impurities, and with reference to an electric treater for partially resolving the artificial emulsion to produce the sludge which is subsequently processed.

Referring to the drawing:

Fig. 1 shows a pipe-line diagram of an apparatus which can be used in the process and which includes two electric treaters.

Fig. 2 is an enlarged view of the electrode structure which can be used in either or both of the electric treaters shown in Fig. 1.

Fig. 3 is an enlarged sectional view of a typical emulsifying valve, such as can be used in conjunction with the apparatus of Fig. 1.

Referring particularly to Fig. 1, the incoming oil containing no more than a few per cent of water and suitably heated is delivered to the system through a pipe 10. The relatively fresh water, suitably heated, may be drawn from any suitable source, shown in Fig. 1 as comprising a tank 11. Pumps 12 and 13 deliver proportioned streams of the oil and relatively fresh water through pipes 14 and 15, respectively, which intersect at a mixing zone 16 where a preliminary mixture is formed by injection and turbulence. If required, this preliminary mixture is additionally mixed by a mixing means 17 which is preferably of a type which will exert substantially the same mixing action on all portions of the stream, as distinct from churning or recirculating certain portions to mix these portions more than others. Mixing by turbulence through a restricted orifice is preferred, and one very satisfactory mixing means is shown in detail in Fig. 3 as comprising a weight-loaded valve, including a weight 19 which can be adjustably positioned along a pivoted arm 20 to control the pressure drop across the valve and the mixing action taking place therein.

The resulting emulsion, in condition for partial resolution, is delivered, either with or without additional heating, through a pipe 24 to a partial resolving means shown in Fig. 1 as an electric treater 25. The details of this treater are best shown in Figs. 1 and 2, from which it will be apparent that the construction includes a tank 26 of the pressure type in which will be present, after continued operation, a body of purified oil 27, a body of water 28, and a body or layer of sludge 29 in an intermediate sludge zone, it being understood that in certain instances the body of sludge may extend to the lower end of the tank 26 if no free water is being separated. The body of oil 27 comprises an oil environment in which are positioned suitable electrodes, preferably of the type shown in detail in Fig. 2.

The electrode structure preferably includes a main live electrode 30 suspended on rods 31 depending from an auxiliary live electrode 32, which is in turn suspended from rods 33, suspension-type insulators 34, and rods 35 attached to the upper end of the tank. A rod 36, insulators 37, and a rod 38 likewise support an intermediate electrode structure, shown as including a main live electrode 40 and an auxiliary live electrode 41 interconnected by rod 42 so as to be of the same potential.

The preferred system for energizing this electrode structure is shown in Fig. 1 and includes high-voltage transformer windings 44 and 45 connected in additive relationship with a common terminal grounded as indicated at 46 to be electrically connected to the grounded tank 26. The high-voltage terminal of the winding 44 is connected by a conductor 47 extending through an insulating bushing 48 to the intermediate live electrode structure. The high-voltage terminal of the winding 45 is similarly connected by a conductor 49 extending through an insulating bushing 50 to the auxiliary electrode 32 and thus to the main electrode 30.

The main live electrodes 30 and 40 coperate in defining a main treating space 52, and the electrode surfaces bounding this treating space are preferably of a type to establish an electric field highly concentrated in certain regions. For example, the main electrode 40 may be composed of a framework below which is mounted a plurality of concentric rings 53 opposite spaces between correspondingly mounted concentric rings 54 of the main electrode 30, as described more in detail in my application supra. Edge-bounded, inclined concentrated-field zones are thus established in the main treating space 52, as indicated by dotted lines 55. The auxiliary live electrodes 32 and 41 are similarly formed to provide an upper auxiliary treating space 56, and these electrodes are preferably of larger size than the main electrodes 30 and 40.

The electrical connection is such that the additive voltages of both transformer windings 44 and 45 are impressed across the main treating space 52 and the upper auxiliary treating space 56 while the potential between any of the electrodes and any grounded portion of the equipment will be equal to the voltage developed in only one of the transformer windings. The lower main live electrode 30 will thus establish an electric field to the body of water 28, the surface of which is indicated by the numeral 57, thus establishing a sludge-treating field in a lower auxiliary treating space 58.

The incoming artificial emulsion moving through the pipe 24 is delivered to a riser 59 and thence to a distributor 60, which preferably directs the emulsion outward in a radial sheet substantially centrally into the main treating space 52, the general flow being indicated by arrows 62. The distributor 60 may be of the spring-loaded type in accordance with the teaching of my application supra, in which event a cap 63 of the distributor may be moved resiliently downward toward a base member 64 thereof to permit the incoming stream to separate these members and provide an orifice through which the artificial emulsion is discharged radially. Such a spring-loaded distributor can be used to emulsify the oil and water constituents additionally and this action is often desirable as it re-forms the emulsion made by prior steps and produces the ultimate emulsion so close to the treating field as to make possible electric treatment before aging of the emulsion.

In the type of treater shown, it is desirable to set up one or more recirculation paths so that any sludge present after once-through-the-field treatment will be recycled repeatedly. In the treater 25, this is desirable as providing further electric treatment for the sludge and reducing the total amount of sludge which must be later resolved. In the electric treater utilized for subsequent sludge resolution, this recirculation is very desirable as permitting continued re-treatment of the sludge until the coalesced water masses drop from the circulation paths to complete the resolution.

Such recirculation can best be accomplished by injection of the artificial emulsion into an open-throat electrode system, such as shown in Figure 2, where the main electrode 40 provides a throat 68 opening on the already-treated oil from which some water has already separated, and where the main electrode 30 provides a throat 69 opening in the general vicinity of the sludge zone. Injection of the incoming artificial emulsion in the direction of the arrows 62 will thus establish a lower circulation path, as indicated by arrows 70, which is outward toward the wall of the tank 26, downward, and then inward toward the riser 59, and thence upward through the throat 69. This introduction of the incoming emulsion also sets up an upper circulation path, indicated by the arrows 71, this circulation path being outward from the main treating space 52, thence upward, inward, and downward through the throat 68. A portion of the upper circulation path may traverse the upper auxiliary treating space 56, as indicated by the arrows 72. The oil environment in which the electrode structure is positioned is of higher resistivity than the incoming artificial emulsion so that the material entering the throat 68 will serve to prevent excessive current flow in the field and thus maintain adequate coalescing potentials between the electrodes 30 and 40.

The action of the electric fields is to coalesce dispersed water droplets in the incoming stream and to combine impurities with the relatively fresh water. When the water masses become of sufficient size, they will gravitate from the circulation paths and move downward through the sludge zone 29 into the body of water 28. Correspondingly, a considerable portion of the water will have separated from the constituents moving through the upper circulation path 71 prior to reentry into the main treating space 52, thus supplying thereto oil of a higher resistivity than the incoming artificial emulsion.

Purified oil containing no objectionable amount of water may be withdrawn from the treater 25 through a pipe 75 and may be delivered either directly to the subsequent refinery equipment or to temporary storage in a tank 76. A valve 77 in the pipe 75 serves to maintain in the treater 25 a superatmospheric pressure, built up by the pumps 12 and 13. In the tank 76, some additional water may settle out and be withdrawn through a pipe 78 as determined by a valve 79. The purified oil may move from the tank 76 through a pipe 80 as controlled by a valve 81, and may move continuously to subsequent refinery equipment, for example topping, fractionating, or cracking units. The water content of this oil will not be more than a few per cent and usually below 3%. The purification treatment accorded the oil will have removed in large measure those impurities engendering corrosion or deposition in the subsequent equipment, and the process will generally serve to improve the products produced in this refinery equipment, as well as improving the operation of the equipment itself.

Water separating in the treater 25 below the sludge zone may be withdrawn through a pipe 82 equipped with a valve 83 which controls the flow and maintains the superatmospheric pressure in the tank 26. The water discharges from the valve 83 into a header 84 from which it is withdrawn for disposal.

In the electric treater 25 complete resolution is not contemplated, aside from the exception later to be mentioned, and the mixing action used in forming the artificial emulsion is such that complete resolution cannot be obtained at the throughput utilized. Correspondingly, some of the sludge accumulates in the sludge zone 29 from which it is withdrawn for subsequent resolution in a manner to be hereinafter described. It will be clear that if this sludge was not withdrawn, the layer of sludge would increase in height until it reached the electrode system, at which time short-circuiting would occur, or such reduction in potential across the electrodes would occur as would make further treatment impractical. It is contemplated that the sludge should be withdrawn from the tank 26 at such rate that the sludge layer does not build up to interfere with the field in the main treating space 52, provided a continuous process is to be employed.

For withdrawing sludge from this sludge zone, I provide a pipe 90 equipped with a valve 91 and delivering the sludge to a pipe 92. In some instances, it is desirable, likewise, to withdraw a stream of water from the body of water 28, and this may be accomplished by opening a valve 93 to permit a desired amount of water to enter the pipe 92 and mix with the sludge.

The sludge moving through the pipe 92 can be pumped by a pump 94 into a pipe 95, thence to a mixing means, shown as comprising a valve 96 of the type shown in Figure 3, and thence into an electric sludge treater 100. This treater may be of the same general construction as the treater 25 previously described, though the spacing of the elements may be different to form fields well suited to the resolution of the sludge. Generally speaking, this sludge treater 100 and the rate of introduction of the sludge thereinto will be controlled to effect substantially complete resolution of the sludge without the accumulation of such an amount of sludge in the treater 100 as will interfere with the maintenance of the electric field. In this treater, the sludge will be re-circulated through the paths as previously described until the water masses are of sufficient size to separate from the oil, moving downward to a body of water 101. This may require modified voltage gradients and a more prolonged treatment than in the treater 25, but the system should be so controlled that there will be no increasing accumulation of sludge in the treater 100, for example immediately above the body of water 101, such as would render ineffective the electric fields employed. In Figure 1, I have shown a substantially clean interface between the body of water 101 and the body of purified oil 102, but it will be clear that some sludge at the interface can be tolerated so long as this sludge does not build up to short-circuit the electrodes or render their operation ineffective.

The constituents of the sludge are delivered to the sludge treater 100 at superatmospheric pressure which can be derived from the pump 94. On the other hand, a mode of operation often found to be desirable is to close valve 103 in the pipe 92 and open valve 104 in a by-pass 105, thus using the pressure of the pumps 12 and 13 to move the sludge into the treater 100. In any event, it is desirable to maintain sufficient superatmospheric pressure in the treater 100 to prevent any vapor formation at the temperature existing therein. It is not desired to vaporize either the water or any of the lighter fractions of the oil before removing the purified oil from this treater through a pipe 107 to the tank 76 through a valve 108.

By proper control of the entire process, the sludge can be continuously delivered to the sludge treater 100 and there continuously resolved into its oil and water constituents, the oil being continuously withdrawn through the pipe 107 equipped with a valve 108 and the water being continuously withdrawn through a pipe 109 through a valve 110 for delivery to the header 84. It should not be understood, however, that the invention contemplates only a continuous process throughout for, in some instances, it is possible to remove sludge intermittently from the treater 25 and process this sludge by continuous, semicontinuous, or batch methods involving the use of an electric field.

Some sludges cannot be completely resolved by such delivery to the treater 100 without further processing, and in Figure 1 I have shown various supplementary actions which can be employed if difficulty is encountered in securing the substantially complete resolution contemplated.

For example, it is often helpful in resolving sludge withdrawn from the treater 25 to add thereto an oil of higher resistivity, particularly if the sludge is of a short-circuiting character. In some instances, the purified oil in the treater 100 can be recycled through the corresponding upper circulation path indicated by the arrows 71 of Figure 2. In other instances, it is desirable to supplement this action by delivering such an oil of higher resistivity to the sludge before entry into the treater 100. While various oils can be used in this connection, the most economical manner of handling the situation is to by-pass a portion of the purified oil from the pipe 75 through a pipe 112, using, if desired, a pump 113 for increasing the pressure thereon. By opening a valve 114, this by-passed oil can be delivered to a mixing zone 115 of the pipe 92. If the valve 114 is closed and a valve 116 open, the oil may be delivered to a mixing zone 117 of the pipe 95. These mixing zones may be mere pipe junctions serving to mix or blend the oil with the sludge by incidental turbulence adjacent such junctions. If additional mixing is desired, this can be effected by proper control of the mixing means 96.

Another supplementary action helpful to sludge resolution is to add additional water to the sludge and maintain this additional water present until the stream is electrically treated. Very advantageous results can be obtained by the dispersion of relatively fresh water into the sludge, the action being then similar to the purifying action of the relatively fresh water in the treater 25. Thus, a portion of the relatively fresh water pumped by the pump 13 may be by-passed from the pipe 15 through a valve 118 to move through a pipe 119 to the sludge stream ahead of the mixing means 96. In this event, the mixing means 96 will be controlled in such manner as to produce a sludge emulsion capable of resolution in the sludge treater 100. The desirable mixing action will vary with different oils but some of the droplets of relatively fresh water dispersed in the sludge in this way should be of a size commensurate with the water droplets present in the sludge stream as this appears to be helpful in sludge resolution. Likewise, it is desirable in many instances that the relatively fresh water droplets be of a heterogeneous particle size. This type of heterogeneity can be obtained by appropriate design or adjustment of the mixing means 96. The amount of relatively fresh water thus added will usually be between 8% and 50% by volume of the sludge stream moving through the pipe 95, and it is desired that the amount of water should be such as to insure the presence of a water-in-oil type of emulsion.

Instead of, or in addition to, the use of relatively fresh water in this connection, it is sometimes desirable to have present in the treater 100 a small amount of the water treated or separated in the treater 25. This is true regardless of whether or not electric expedients are used in the treater 25 in the partial resolution of the artificial emulsion, for such partial resolution appears to insure the presence of counter-emulsifying agents in the coalesced or separated water, which agents appear beneficial in subsequent sludge treatment. Additional counter-emulsifying agents may also be present due to chemical reactions prior to the partial resolution in the treater 25, and the electric field therein, if used, may have additional beneficial effects in this connection. The pipe 90 may receive some of the separated water, particularly as the sludge layer is reduced in volume, but the presence in the sludge of some of the separated water can always be insured by opening the valve 93 to the desired extent.

Due to the presence of such counter-emulsifying agents in the body of water 28, it is likewise desirable in some instances to re-introduce some of this water into the emulsion delivered to the treater 25. This can be done by withdrawing some water from the header 84 through valve 123 and pipe 124, using a pump 125 to force this water along a pipe 126 through a valve 127 and into the artificial emulsion. In this instance, it has been sometimes found better to introduce the water beyond the mixing means 17, and the pipe 126 is shown as communicating with the pipe 24 in this connection. However, in most instances it is desirable to connect the pipe 126 to the pipe 15 through pipe 126a and valve 127a so that both the relatively fresh water and the separated water are introduced into the pipe 14 ahead of the mixing means 17.

The pump 125 can also be used to re-introduce into the treater 25 some of the sludge withdrawn from the sludge zone 29. In this connection, a pipe 129 communicates between the mixing zone 117 of the pipe 95 and the intake of the pump 125. By opening a valve 130 in the pipe 129, a portion or all of the sludge can be returned from the pipe 95 to the pipe 24 to mix or blend with the artificial emulsion. Under this mode of operation it is necessary that the sludge enter the stream beyond the mixing means 17 rather than to enter the pipe 14 ahead of this mixing means. Under such mode of operation the valve 127a will remain closed. In some instances, it is possible to operate in this manner without the building up of the sludge layer in the treater 25 to such an extent as to interfere with the maintenance of the electric field, and in this event the treater 25 can be used to substantially completely resolve the emulsion in that there will be no such increase or accumulation of sludge as will interfere with the maintenance of the electric field or require treatment in a separate sludge-breaking treater.

Another supplementary step often desirable in solving satisfactorily the sludge-resolving problem involves the addition of a small quantity of a chemical de-emulsifying agent. As shown in Figure 1, such an agent may be withdrawn from the tank 140 by a pump 141 and delivered through a valve 142 in a pipe 143 to the pipe 95 at a position ahead of the mixing means 96. Alternatively, the valve 142 can be closed so that the chemical is moved through a pipe 144 and a valve 145 into the pipe 92 ahead of the pump 94 or the by-pass 105, thus using the turbulence attendant upon stream flow or the mixing action of the pump 94 to insure proper dispersion of the chemical throughout the sludge stream. In addition, or supplementary hereto, all or a portion of the chemical can be moved from the pipe 144 through a valve 146 for delivery to the water flowing through the pipe 124, thus permitting introduction of chemical into water or sludge withdrawn from the treater 25 and returned to the treater ahead of or beyond the mixing means 17, as previously described. It will be apparent that if a portion or all of the sludge is recycled from the pipe 95 through the pipe 129, the chemical can be introduced into this sludge through the valve 145 before recycling, or if both water and sludge are being recycled, some or all of the chemical can be added to the pipe 124 by opening the valve 146.

Chemicals which are suitable for use in the present invention may be generally classified as de-emulsifying agents adapted to destabilize and/or resolve water-in-oil emulsions, typically crude oil emulsions. A wide variety of such chemical agents is known to the art, and includes water-softening agents, such as described in the patent to Barnickel No. 1,223,659, modified fatty acids and their derivatives, such as described in the Barnickel Patent No. 1,467,831, and compounds of various composition, such as described in U. S. Patents Nos. 1,976.602; 1,977,048; 1,977,089; 1,977,146; 1,978.227; 2,000,717; 2,023,976; 2,023,979; 2,023,993; 2,023,995; 2,026,217; 2,050,923; 2,052,284; 2,077,230; 2,077,746; 2,078,652; 2,081,005; 2,104,793; 2,106,240; 2,110,849; and 2,127,905.

Excellent results are obtained by the use of de-emulsifying agents which are mutually soluble in both the oil and water phases. It is frequently advantageous, however, to employ agents which are preferentially soluble or dispersible in the oil phase, such as are disclosed in certain of the above-cited references.

On the other hand, these same chemicals can often be advantageously used ahead of the treater 25, in which event the chemicals may be introduced into the pipe 124 or into the sludge withdrawn from the pipe 95 if recycling expedients are employed, this mode of operation having been previously described.

In other instances, such chemicals can be introduced into the incoming oil ahead of the mixing means 17. For example, such chemicals may be withdrawn from a tank 150 by pump 151. If desired, they can be introduced into the pipe 10 by opening a valve 152, or by closing this valve and opening a valve 153 they can be added in proportioned amount to a relatively fresh water moving through the pipe 15, being dissolved or dispersed therein depending upon their character. In other instances, such chemicals may be added both to the incoming oil and to the water in pipe 15 with very desirable results, as by suitable adjustment of valves 152 and 153 so as to control the relative proportions added to each liquid.

Heat and pressure will also facilitate sludge resolution to some extent. Using the electric treaters shown in Figure 1, it is usually desirable to heat the incoming oil or the relatively fresh water, or both, prior to introduction into the treater 25 or to heat these constituents after mixing and before delivery to this treater. Superatmospheric temperatures up to the boiling point of water or of the lighter constituents of the oil at the pressure existing in the treater 25 can be used, though in some instances the electric treater can operate at room or atmospheric temperature. Temperatures between 140 and 210° F., or above, are commonly employed. Similar temperatures are applicable to the sludge resolution in the treater 100.

In many instances, I find it desirable to maintain the superatmospheric pressure in both the treaters 25 and 100 and, in this connection, the tanks of these treaters are of the pressure type. On some oils, pressures of 15 lbs./sq. in. will be found satisfactory, but on other oils much higher pressures can be used advantageously, it being understood that conditions of temperature and pressure will be correlated so as to avoid objectionable liberation and separation of vapors in the treaters.

In some instances, the electric fields in the treater 25 can be de-energized and reliance placed upon one or more of the supplementary sludge-resolving actions to facilitate partial resolution in the treater 25. For example, the application of appropriate temperatures and pressures, sometimes considerably higher than those mentioned above, can be used on certain oils to secure the desired partial resolution while avoiding separation of vapors by maintaining suitable pressures, and in this event the sludge accumulation can be withdrawn and treated electrically as previously described. Similarly, the application of chemicals in this partial resolution is often helpful, and even in the absence of the electric fields in the treater 25, partial resolution with the aid of chemicals withdrawn from the tank 150 can, in some instances, be utilized to form the sludge which is subsequently processed. In either instance, it is desirable to proportion relatively fresh water into the pipe 24, as previously outlined.

The system shown in Figure 1 is adapted to the production and processing of various sludges, and it will be clear from the previous description that various modes of operation are possible. In all instances when using a continuous process, it is found desirable to proportion the materials, and the various pumps disclosed can be in the form of proportioning pumps or suitably correlated to give the desired result.

In many instances, it is desirable to develop in the treater 25 sufficient pressure to force the sludge constituents into and through the treater 100, but on other oils the use of an intermediate pump 94 will be advantageous.

Some of the relatively fresh water dispersed into the incoming oil will appear in the sludge layer coexisting with some of the impurities in the incoming oil, and subsequent electric treatment of this sludge will thus be in the presence of some residual relatively fresh water. Furthermore, by recycling of the sludge through the closed circulation path of the treater 100, such residual water will be present until coalesced with other water or brought into association with additional impurities, and recirculation is an excellent way of insuring the presence of this type of residual relatively fresh water.

Experience has shown that the treating action in the electric field of the sludge-resolving treater 100 is improved by the presence of some of the water resulting from the partial resolution in the treater 25. In the present application, generally speaking, this water is termed "effluent water" and may be present in the sludge treated in the treater 100 either in the form of water droplets comprising a part of the withdrawn sludge or water droplets formed by adding some of the separated water to the sludge. The sludge withdrawn from the treater 25 comprises a concentrated emulsion of water in oil, and some of the water droplets are the result of coalescence between water droplets in the electric field of the treater 25. As pointed out above, such effluent water contains counter-emulsifying agents resulting from prior processing steps, i. e., agents adapted to promote the oil-in-water type of emulsion and antagonistic to the water-in-oil type. While the action in this connection is not completely understood, I believe this action involves conversion of emulsifying agents from an oil-dispersible state, in which they tend to stabilize oil-continuous emulsions, to a water-dispersible state, in which they tend to stabilize water-continuous emulsions. As mentioned above, such conversion may take place through chemical reaction in or prior to the treater 25, and may be aided by the presence of an electric field though not dependent thereon.

If it is desired to have more of this effluent water present in the sludge stream preparatory to further electric treatment than is present in the sludge itself, this can be accomplished by appropriate adjustment of the valve 93 which withdraws water from the body of water 28. On the other hand, if the sludge is to be recycled through the treater 25, appropriate control of the valve 123 will permit introduction of the desired amount of the separated water. In any instance, it should be understood that any such separated water cannot be used as a substitute for the relatively fresh water, but that limited amounts thereof appear to be beneficial in facilitating electric resolution of sludge.

From the above, it will be clear that this invention is concerned with the production and treatment of what may be arbitrarily termed "fresh water sludges." This type of sludge is to be distinguished from sludges which are sometimes encountered in simple dehydration processes acting upon crude oil emulsions, for in such sludges the water is composed entirely of the original brine and contains no coexisting droplets of brine and relatively fresh water.

Various changes and modifications can be made without departing from the spirit of this invention as defined in the appended claims.

I claim as my invention:

1. A process for purifying mineral oils of low water content to remove water-soluble or water-wettable impurities capable of being taken up by a relatively fresh water, which process includes the steps of: mixing said oil and relatively fresh water to form an emulsion while using a mixing action more intense than that which will permit complete resolution of the emulsion into oil and water in the succeeding resolution step; partially resolving said emulsion to form an oil containing a small amount of dispersed water and a sludge relatively rich in water as compared to the water content of said emulsion and comprising a concentrated emulsion of water in oil; mixing proportioned amounts of said sludge and said relatively fresh water to form a new emulsion; establishing an electric field of sufficient intensity to coalesce the water droplets of said new emulsion; subjecting said new emulsion to the action of said field while there is present in said field sufficient oil to permit maintenance of high voltage gradients therein, said field acting to coalesce the dispersed water of said new emulsion; and separating the coalesced water.

2. A process for purifying mineral oils of low water content to remove water-soluble or water-wettable impurities capable of being taken up by a relatively fresh water, which process includes the steps of: mixing said oil and relatively fresh water to form an emulsion while using a mixing action more intense than that which will permit complete resolution of the emulsion into oil and water in the succeeding resolution step; continuously partially resolving said emulsion while at elevated temperature in a zone maintained under superatmospheric pressure to form an oil containing a small amount of dispersed water and a sludge relatively rich in water as compared to the water content of said emulsion and comprising a concentrated emulsion of water in oil, said sludge tending to build up as a sludge layer in said zone of superatmospheric pressure; withdrawing sludge from said zone of superatmospheric pressure at such rate as to prevent such building up of said sludge layer and while maintaining a superatmospheric pressure on said sludge; mixing the withdrawn sludge while at superatmospheric pressure with relatively fresh water to form a new emulsion; establishing an electric field of sufficient intensity to coalesce the water droplets of said new emulsion; utilizing the superatmospheric pressure under which the sludge and relatively fresh water were mixed to move said new emulsion to said electric field to coalesce the dispersed water of said new emulsion; maintaining sufficient oil in said electric field to permit maintenance of high voltage gradients therein; and separating the coalesced water.

3. A process for purifying mineral oils of low water content to remove water-soluble or water-wettable impurities capable of being taken up by a relatively fresh water, which process includes the steps of: mixing said oil and relatively fresh water to form an emulsion while using a mixing action more intense than that which will permit complete resolution of the emulsion into oil and water in the succeeding resolution step; continuously partially resolving said emulsion to form an oil containing a small amount of dispersed water and a sludge relatively rich in water as compared to the water content of said emulsion and comprising a concentrated emulsion of water in oil; pumping together proportioned streams of said sludge, said relatively fresh water, and said oil resulting from said partial resolution to form a new emulsion; establishing an electric field of sufficient intensity to coalesce the water droplets of said new emulsion; continuously introducing said new emulsion into said electric field while continuously recycling sludge through a closed circulation path traversing said field until the dispersed water of said new emulsion is coalesced into masses of sufficient size to gravitate from said closed circulation path; and limiting the rate of continuous introduction of said new emulsion into said field so as not to exceed the rate at which substantially complete resolution of said sludge can be continuously obtained with the aid of said electric field and the recirculation therethrough, thereby preventing progressive accumulation of sludge in the vicinity of the electric field in such amount as to prevent maintenance of said electric field for extended periods of time.

4. A process for purifying mineral oils of low water content to remove water-soluble or water-wettable impurities capable of being taken up by a relatively fresh water, which process includes the steps of: mixing said oil and relatively fresh water to form an emulsion while using a mixing action more intense than that which will permit complete resolution of the emulsion into oil and water in the succeeding resolution step; continuously partially resolving said emulsion to form an oil containing a small amount of dispersed water and a sludge relatively rich in water as compared to the water content of said emulsion and comprising a concentrated emulsion of water in oil; removing a stream of sludge from the zone of partial resolution and pumping same to a mixing zone; forcibly introducing into said mixing zone a proportioned amount of relatively fresh water and mixing same with said sludge in said mixing zone, whereby the mixing of the relatively fresh water with the sludge can be controlled independent of any mixing action at the point of pumping, thereby forming a new emulsion of the water-in-oil type; establishing an electric field of sufficient intensity to coalesce the water droplets of said new emulsion; continuously introducing said new emulsion into said electric field for continuous resolution thereof and in a manner to re-circulate the sludge through said field repeatedly until the dispersed water droplets are coalesced into masses of sufficient size to gravitate from the circulation path; maintaining sufficient oil in said electric field to permit maintenance of high voltage gradients therein; and separating the coalesced water.

5. A process for purifying mineral oils of low water content to remove water-soluble or water-wettable impurities capable of being taken up by a relatively fresh water, which process includes the steps of: mixing said oil and relatively fresh water to form an emulsion while using a mixing action more intense than that which will permit complete resolution of the emulsion into oil and water in the succeeding resolution step; continuously partially resolving said emulsion at elevated temperature in a zone maintained under superatmospheric pressure to form an oil containing a small amount of dispersed water and a sludge relatively rich in water as compared to the water content of said emulsion and comprising a concentrated emulsion of water in oil; withdrawing sludge from said zone and adding thereto a de-emulsifying agent adapted to facilitate electric resolution thereof; also adding a proportioned amount of relatively fresh water to said sludge withdrawn from said zone to disperse this water effectively throughout the sludge; establishing an electric field of sufficient intensity to coalesce the water droplets of said sludge; and continuously circulating said sludge in a closed circulation path traversing said field to coalesce the dispersed water of said sludge progressively until of sufficient size to gravitate from said circulation path and while maintaining in said field sufficient oil of higher resistivity than said sludge to permit maintenance of said electric field; and collecting the coalesced water.

6. A process for purifying mineral oils of low water content to remove water-soluble or water-wettable impurities capable of being taken up by a relatively fresh water, which process includes the steps of: mixing said oil and relatively fresh water to form an emulsion while using a mixing action more intense than that which will permit complete resolution of the emulsion into oil and water in the succeeding resolution step; continuously partially resolving said emulsion in a separation zone to produce in the upper end thereof a body of oil containing a small amount of dispersed water, a body of water in the lower end thereof, and an intermediate layer of sludge; withdrawing sludge from said layer of sludge at a rate which is at least equal to the rate at which said sludge tends to accumulate in said layer of sludge; withdrawing water from said body of water; mixing the sludge and water thus withdrawn to form a new emulsion of the water-in-oil type; establishing an electric field of sufficient intensity to coalesce the dispersed water in said new emulsion; continuously delivering said new emulsion to said electric field for continuously resolving same and while maintaining in said field sufficient oil of higher resistivity than said new emulsion to permit maintenance of said electric field; and re-circulating the sludge through said field until the water masses thereof are of sufficient size to gravitate from the circulation path.

7. A process for purifying mineral oils of low water content to remove water-soluble or water-wettable impurities capable of being taken up by a relatively fresh water, which process includes the steps of: mixing said oil and relatively fresh water to form an emulsion while using a mixing action more intense than that which will permit complete resolution of the emulsion into oil and water in the succeeding resolution step; continuously partially resolving said emulsion at elevated temperature in a settling zone maintained under sufficient superatmospheric pressure to prevent the separation of vapors in said zone, thereby producing in said zone an upper body of oil, a lower body of water, and an intermediate body of sludge, said sludge comprising a concentrated oil-continuous emulsion containing dispersed water droplets and said sludge being relatively rich in water as compared to the emulsion; separately withdrawing oil, sludge and water respectively from said bodies thereof in said separating zone at substantially the same rate as these materials are formed therein; blending streams of the withdrawn sludge and an oil of higher resistivity than such withdrawn sludge in such proportions as to form a modified oil-continuous emulsion susceptible of resolution with the aid of an electric field; and introducing this modified emulsion while at elevated temperature into a coalescing electric field while repeatedly re-circulating the sludge constituents through said field until such coalescence of dispersed water has taken place as will permit gravitational separation thereof from the circulation path and while maintaining sufficient superatmospheric pressure in the zone of gravitational separation to prevent liberation and separation of vapors at the existing elevated temperature.

8. A process for purifying mineral oils of low water content to remove water-soluble or water-wettable impurities capable of being taken up by a relatively fresh water, which process includes the steps of: continuously pumping together under superatmospheric pressure proportioned streams of said oil and said relatively fresh water and mixing same to form an emulsion while using a mixing action more intense than that which will permit complete resolution of the emulsion into oil and water in the succeeding resolution step; continuously partially resolving said emulsion to form an oil containing a small amount of dispersed water and a water-in-oil type sludge comprising a concentrated emulsion of water in oil by delivering a stream of said emulsion while at elevated temperature to a zone maintained under superatmospheric pressure by use of the pressure utilized in pumping said streams of oil and relatively fresh water together; establishing in an oil environment of another zone an electric field of sufficient intensity to coalesce the dispersed water droplets of said sludge; withdrawing sludge from said zone of superatmospheric pressure substantially as fast as said sludge separates therein and while maintaining a superatmospheric pressure on the sludge sufficient to prevent liberation of vapors and continuously delivering the withdrawn sludge to said electric field in a manner to establish a closed circulation path in said oil environment and traversing said electric field to circulate said sludge in said closed circulation path until the droplets of water therein progressively coalesce to such size as to gravitate from said circulation path; and separately removing from said other zone the coalesced water and the oil while restricting the discharge thereof to establish in said other zone a superatmospheric pressure sufficient to prevent liberation of vapors from said sludge.

9. A composite continuous desalting process for removing salts from low-water-content mineral oils, which salts are capable of being taken up by a relatively fresh water, which process includes the steps of: mixing said oil and relatively fresh water to form a synthetic emulsion; partially resolving said synthetic emulsion in a subsequent resolution step by delivering a continuous stream of said synthetic emulsion to a zone of resolution comprising a settling zone, the intensity of said mixing and the rate of delivery of said synthetic emulsion to said resolution zone being such that said emulsion is only partially resolved therein to produce bodies of oil-continuous and water-continuous material with an intervening layer of sludge comprising a concentrated unresolved emulsion of the water-in-oil type, said layer of sludge tending to build up in said zone as more and more of said synthetic emulsion is partially resolved therein; withdrawing oil-continuous and water-continuous materials respectively from the bodies thereof in said resolution zone and substantially as fast as said materials form therein; withdrawing sludge from said sludge layer separate from the withdrawal of said oil-continuous and water-continuous materials and at such rate as to prevent such building up of said sludge layer; and resolving the withdrawn sludge at such rate as to make the entire process continuous, said resolution of said withdrawn sludge being effected by continuously circulating said withdrawn sludge in a closed circulation path in an oil environment of a separating zone spaced from said resolution zone and establishing a coalescing electric field to act upon said sludge moving in said closed circulation path to coalesce the water droplets thereof progressively to such size as to gravitate from said circulation path.

10. A process for desalting salty mineral oils of low water content containing dispersed saline impurities capable of being taken up by relatively fresh water, which process includes the steps of: mixing said oil and relatively fresh water to form an artificial emulsion while using a mixing action more intense than that which will permit complete resolution of the emulsion into oil and water in the succeeding resolution step; delivering a stream of said emulsion to a resolving zone and there partially resolving said emulsion to form a body of purified oil containing a small amount of dispersed water and to form a layer of water-in-oil type sludge beneath said body of purified oil, said sludge being relatively rich in water as compared with the water content of said artificial emulsion and being in itself a concentrated emulsion having a continuous phase of oil in which water droplets are dispersed, said layer of sludge tending to build up by increasing in depth during the continued delivery of said artificial emulsion to said resolving zone; establishing in another zone spaced from said resolving zone an electric field of sufficient intensity to coalesce the dispersed water droplets of said sludge; withdrawing sludge from said sludge layer in said resolving zone substantially as fast as it tends to build up therein and at a rate to maintain the depth of said sludge layer substantially constant and moving this withdrawn sludge directly to said electric field; repeatedly circulating said sludge in said other zone through a closed circulation path traversing said electric field to coalesce said droplets of water progressively until they are of such size as to gravitate from said circulation path and while maintaining sufficient oil in said electric field to permit maintenance of high voltage gradients therein; and collecting the thus-coalesced water in a body of water in the bottom of said other zone while withdrawing water from this body of water to maintain it below said electric field and thus prevent short-circuiting of said field.

11. A process for desalting salty mineral oils of low water content containing dispersed saline impurities capable of being taken up by relatively fresh water, which process involves the use of a live electrode and includes the steps of: mixing said oil and relatively fresh water to form an artificial emulsion while using a mixing action more intense than that which will permit complete resolution of the emulsion into oil and water in the succeeding resolution step; delivering a stream of said emulsion to a resolving zone and there partially resolving said emulsion to form a body of purified oil containing a small amount of dispersed water and to form a layer of water-in-oil type sludge beneath said body of purified oil, said sludge being relatively rich in water as compared with the water content of said artificial emulsion and being in itself a concentrated emulsion having a continuous phase of oil in which water droplets are dispersed, said layer of sludge tending to build up by increasing in depth during the continued delivery of said artificial emulsion to said resolving zone; establishing in another zone spaced from said resolving zone an electric field surrounding said live electrode, said field being of sufficient intensity to coalesce the dispersed water droplets of said sludge, said other zone including a body of water below said live electrode bounding the electric field on the lower side of said electrode; withdrawing sludge from said sludge layer in said resolving zone substantially as fast as it tends to build up therein and at a rate to maintain the depth of said sludge layer substantially constant and moving this withdrawn sludge directly to said electric field; repeatedly circulating said sludge in said other zone through a closed circulation path around said live electrode to coalesce said droplets of water progressively until they are of such size as to gravitate from said circulation path to said body of water and while maintaining sufficient oil in said electric field to permit maintenance of high voltage gradients therein; and withdrawing water from said body of water at such rate as to maintain the water body below and spaced from said live electrode to prevent short-circuiting thereof.

12. A process as defined in claim 10, in which said oil and relatively fresh water are mixed under superatmospheric pressure by bringing streams of said oil and relatively fresh water together and mixing same to form said artificial emulsion, and in which said superatmospheric pressure is sufficient to deliver said artificial emulsion to said resolving zone and maintain a superatmospheric pressure in this zone and deliver said withdrawn sludge to said electric field without additional pressuring of the sludge, thereby avoiding additional mixing of said withdrawn sludge incidental to such additional pressuring before subjecting this sludge to said electric field.

13. A process for desalting salty mineral oils of low water content containing dispersed saline impurities capable of being taken up by relatively fresh water, which process includes the steps of: mixing said oil and relatively fresh water to form an artificial emulsion while using a mixing action more intense than that which will permit complete resolution of the emulsion into oil and water in the succeeding resolution step; delivering a stream of said emulsion to a resolving zone and there partially resolving said emulsion to form a body of purified oil containing a small amount of dispersed water and to form a layer of water-in-oil type sludge beneath said body of purified oil, said sludge being relatively rich in water as compared with the water content of said artificial emulsion and being in itself a concentrated emulsion having a continuous phase of oil in which water droplets are dispersed, said layer of sludge tending to build up by increasing in depth during the continued delivery of said artificial emulsion to said resolving zone; establishing in another zone spaced from said resolving zone an electric field of sufficient intensity to coalesce the dispersed water droplets of said sludge; withdrawing sludge from said sludge layer in said resolving zone substantially as fast as it tends to build up therein and at a rate to maintain the depth of said sludge layer substantially constant; adding to this withdrawn sludge a small amount of a chemical deemulsifying agent adapted to facilitate electric resolution thereof and moving the thus-modified sludge directly to said electric field; repeatedly circulating said sludge in said other zone through a closed circulation path traversing said electric field to coalesce said droplets of water progressively until they are of such size as to gravitate from said circulation path and while maintaining sufficient oil in said electric field to permit maintenance of high voltage gradients therein; and collecting the thus-coalesced water in a body of water in the bottom of said other zone while withdrawing water from this body of water to maintain it below said electric field and thus prevent short-circuiting of said field.

HAROLD C. EDDY.

REFERENCES CITED

The following references are of record in the file of this patent:

UNITED STATES PATENTS

| Number | Name | Date |
|---|---|---|
| 987,115 | Cottrell | Mar. 21, 1911 |
| 1,405,118 | Harris | Jan. 31, 1922 |
| 1,405,119 | Harris | Jan. 31, 1922 |
| 1,826,276 | Eddy | Oct. 6, 1931 |
| 1,838,919 | Eddy | Dec. 29, 1931 |
| 1,838,978 | Worthington | Dec. 29, 1931 |
| 1,825,309 | Eddy | Sept. 29, 1931 |
| 1,838,890 | Loenen | Dec. 29, 1931 |
| 2,033,152 | Roberts | Mar. 10, 1936 |
| 2,033,567 | Worthington | Mar. 10, 1936 |

OTHER REFERENCES

Hawthorne et al., "The Removal of Inorganic Salts from Crude Petroleum," publ. in American Petroleum Inst. Proceedings, May 1938, p 66, seventh full paragraph in left hand column—204/190.